Dec. 20, 1938.  R. F. MEEH  2,141,007
SHOVEL
Filed April 18, 1938
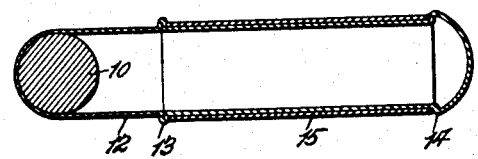
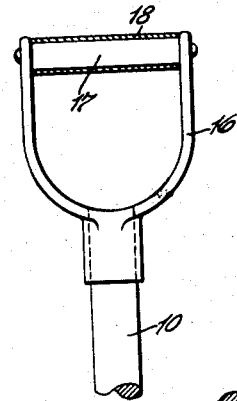
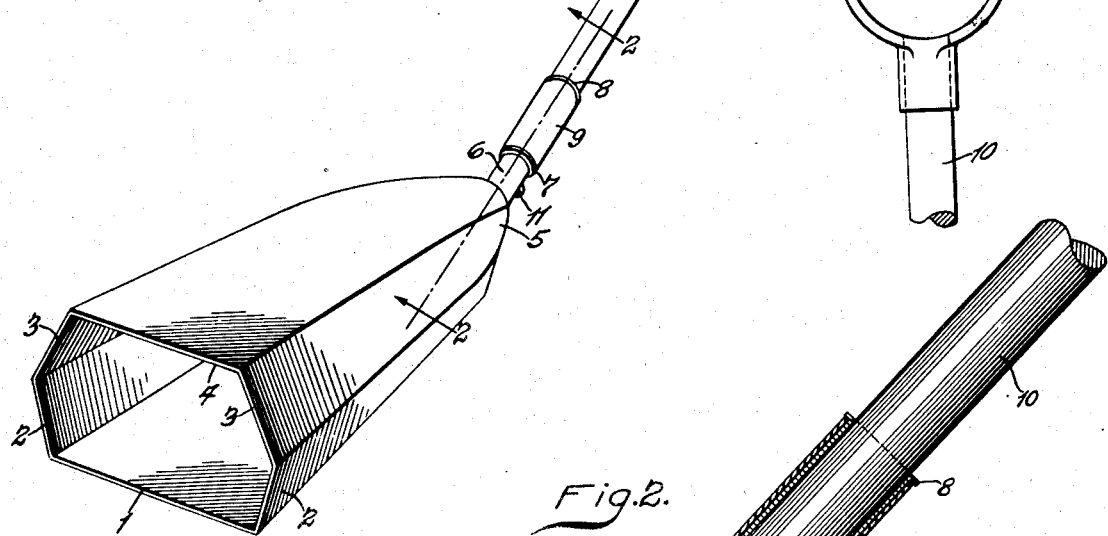
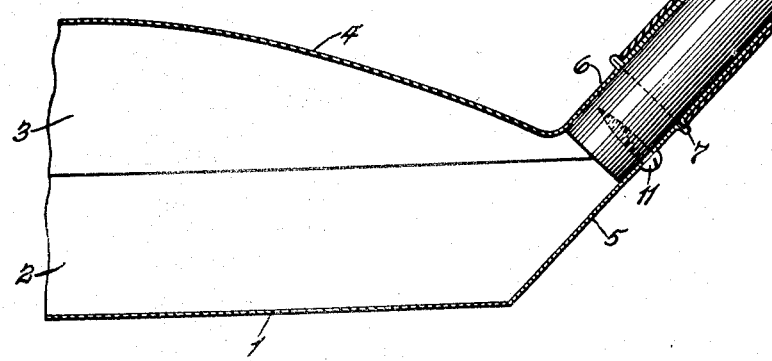
Inventor
Robert F. Meeh
By Rippey & Cassidy
His Attorneys Patented Dec. 20, 1938

2,141,007

UNITED STATES PATENT OFFICE 2,141,007

SHOVEL

Robert F. Meeh, St. Louis, Mo.

Application April 18, 1938, Serial No. 202,691

2 Claims. (Cl. 294—55)

This invention relates to shovels; and has special reference to a shovel having walls forming an enclosure or compartment in combination with a handle rigid with the shovel proper and having mounted thereon rotary sleeves constituting hand holds facilitating the turning of the shovel to discharge the contents therefrom without a longitudinal thrust.

An object of the invention is to provide a shovel comprising an enclosure having a handle rigid therewith and having rotary sleeves mounted on the handle in spaced and angular relationship so that the shovel may be held in one position to scoop the material to be removed, and then rotated to discharge the material from the shovel because of the angular relationship of the handle and the shovel.

Another object of the invention is to provide a shovel including an enclosure open at one end and closed otherwise throughout, in combination with a handle attached to the shovel in angular relationship and having rotary hand hold sleeves mounted on the handle in angular relationship so that, after the material has been scooped into the shovel and lifted, the shovel may be easily rotated in order to discharge the contents into a furnace or the like.

Other objects will appear from the following description, reference being made to the annexed drawing, in which—

Fig. 1 is a perspective view of a complete shovel of one embodiment of the present invention.

Fig. 2 is an enlarged sectional view approximately on the line 2—2 of Fig. 1.

Fig. 3 is an enlarged sectional view approximately on the line 3—3 of Fig. 1.

Fig. 4 is a view showing a slight modification of the invention.

The shovel is an enclosure made of sheet metal and comprising a bottom wall 1, upwardly flaring side walls 2, upwardly converging wall portions 3 integral with the walls 2, and a top wall 4 which may be parallel with the wall 3, or otherwise arranged as desired. In its special application for use in charging furnaces, the shovel is designed to receive and hold coal, coal particles, fragments, and even coal dust, to be thrown into a furnace or the like. A purpose of making the shovel in the enclosure form described is to provide means for receiving the coal, coal particles, fragments and coal dust without scattering or distributing the same over the basement or room in which the furnace is located.

The front or receiving and discharging end of the shovel is open, as shown, and the rear end 5 is completely closed, so that none of the contents of the shovel may fall through the rear end thereof. The rear end of the shovel, which is made of sheet metal or the like, has an integral or rigid sleeve 6 (Fig. 2) formed with a circumferential bead 7 adjacent to the shovel and a circumferential bead or flange 8 at its outer end. The space between the parts 7 and 8 should be fully equal to the width of the hand that grasps the shovel handle between them, and they should be smooth so that the hand grasping the handle between said parts will not be harmed.

A collar 9 is rotatively mounted around the sleeve 6 between the parts 7 and 8, and is thereby held from longitudinal movement, but is freely rotative and constitutes a hand hold for the user.

A handle 10 extends into the sleeve 6 and is rigidly attached thereto by one or more fasteners 11, so that the handle and shovel are not relatively rotative. To the outer end of the handle 10, an angular element 12 is rigidly secured. The angular element 12 may be made of sheet metal or of other material, as desired.

Spaced ribs 13 and 14 are formed integral or rigid with the laterally extended portion of the angular element 12, and a sleeve 15 is rotatively mounted upon said element 12 between the ribs 13 and 14. This leaves the sleeve 15 freely rotative but incapable of longitudinal movement.

In the modification shown in Fig. 4, the handle 10 has attached to its outer end a stirrup 16, the arms of which are connected by a cross-member 17, upon which is mounted a rotary sleeve 18. In this embodiment, one hand of the user extends into and through the stirrup 16 and grasps the sleeve 18, which is freely rotative. The sleeve 18 may be considered as functioning for the same purpose as the sleeve 15, which is grasped by one hand of the user, it being apparent that the sleeve 9 is mounted on the inner end of the handle 10 of Fig. 4, as shown in the preceding views of the drawing and described.

The shovel is used by grasping one hand about the sleeve 9 and the other hand about the sleeve 15 or the sleeve 18 and wielding the shovel as a scoop to take up and receive the coal, coal particles, fragments and coal dust, and then extending the shovel into a furnace or the like, and then turning the shovel within the hand that holds the sleeve 9 so as to extend the open end of the shovel downwardly and thereby discharge the shovel contents into the furnace.

The invention may be varied within the scope of equivalent limits without departure from the nature and principle thereof as defined by the appended claims.

I claim:—

1. A shovel comprising walls forming an enclosure open at one end and closed at the opposite end, a sleeve rigid with the closed end of the shovel and extending angularly upwardly and rearwardly therefrom, a pair of longitudinally spaced flanges integral with said sleeve, a collar rotatively mounted around the sleeve between said flanges and held from longitudinal movement thereby, a handle extending into and rigidly attached to said sleeve and projecting upwardly and rearwardly therefrom, and a rotary sleeve mounted on the outer end of said handle approximately at right angles to said first named sleeve and facilitating turning of the shovel to extend the open end thereof downwardly and discharge the contents therefrom.

2. A shovel comprising walls forming an enclosure open at its forward end and closed at the opposite end, a sleeve rigid with said closed end of said shovel, a pair of longitudinally spaced abutments rigid with said sleeve, a rotary collar enclosing the sleeve between said abutments and held from longitudinal movement thereby, a handle having one end extending into said sleeve, means rigidly attaching said handle to said sleeve, an angular element rigidly attached to the outer end of said handle and extending approximately at a right angle thereto and to said sleeve, a sleeve rotatively mounted on said element at approximately a right angle to said first named sleeve, and means holding said second sleeve on said element.

ROBERT F. MEEH.